US006530609B1

(12) United States Patent
Chatterton

(10) Patent No.: US 6,530,609 B1
(45) Date of Patent: Mar. 11, 2003

(54) HOSE AND CLAMP ASSEMBLY

(75) Inventor: Andrew Myles Chatterton, Collingwood (CA)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/068,188

(22) Filed: Feb. 5, 2002

(51) Int. Cl.[7] ............................................... F16L 25/00
(52) U.S. Cl. .................... 285/420; 285/23; 285/252; 285/253
(58) Field of Search ...................... 285/420, 23, 252, 285/253

(56) References Cited

U.S. PATENT DOCUMENTS

| 1,278,598 A | * | 9/1918 | Cooper ........................ 24/279 |
| 2,283,179 A | * | 5/1942 | Buckingham ................ 24/279 |
| 3,407,448 A | * | 10/1968 | Tetzlaff et al. ................ 24/19 |
| 3,564,676 A | * | 2/1971 | Oeser ........................... 24/279 |
| 3,593,502 A | | 7/1971 | Pelosi, Jr. |
| 4,299,012 A | * | 11/1981 | Oetiker ......................... 24/19 |
| 4,882,814 A | * | 11/1989 | Takahashi .................. 24/20 CW |
| 5,002,094 A | | 3/1991 | Brovont |
| 5,185,913 A | | 2/1993 | Campo et al. |
| 5,234,233 A | | 8/1993 | Fix |
| 5,388,321 A | | 2/1995 | Farrell |
| 5,456,784 A | | 10/1995 | Cogdill et al. |
| RE35,253 E | | 5/1996 | Worley |
| 5,584,104 A | * | 12/1996 | Stuart .......................... 24/104 |
| 5,616,205 A | * | 4/1997 | Cogdill et al. .............. 156/229 |
| 5,623,391 A | | 4/1997 | Belik |
| 5,820,166 A | * | 10/1998 | Webb ......................... 24/20 R |
| 6,116,657 A | | 9/2000 | Oetiker |
| 6,390,136 B1 | * | 5/2002 | Hutchins et al. ............ 138/109 |

* cited by examiner

Primary Examiner—Lynne H. Browne
Assistant Examiner—James M. Hewitt
(74) Attorney, Agent, or Firm—Nancy T. Krawczyk

(57) ABSTRACT

A hose and clamp assembly wherein the clamp is affixed to the hose in a single location, with limited circumferential movement of the clamp. The hose and clamp assembly is comprised of a hose, an annular hose clamp, and a clip. The clamp has an aperture therein and, in the hose and clamp assembly, is placed around the hose in a predetermined location and orientation. The clip has a protrusion that extends through the clamp aperture for securing the clip to the clamp. The clip is secured to the underside of the clamp and the clip is secured to the hose.

5 Claims, 4 Drawing Sheets

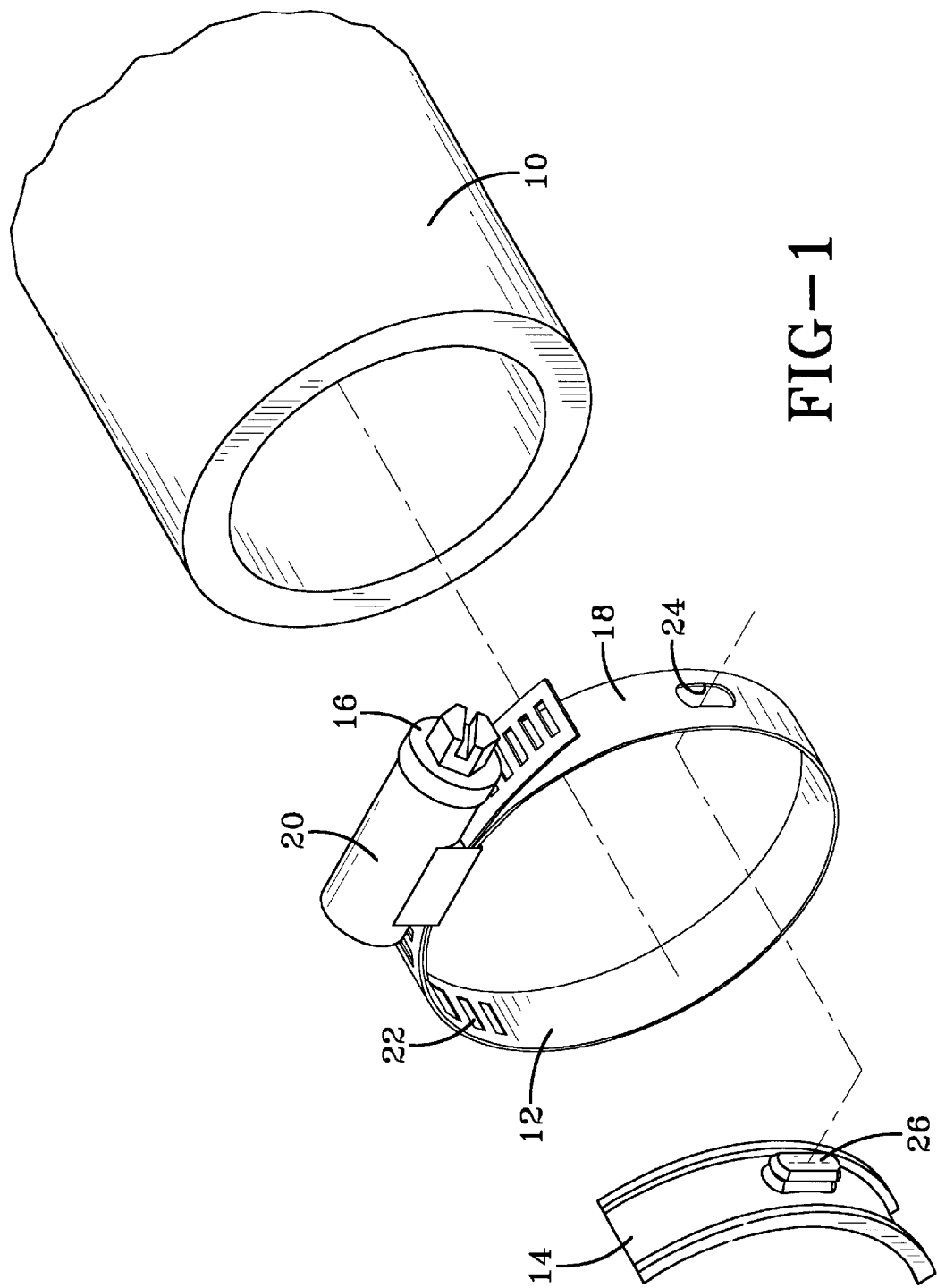

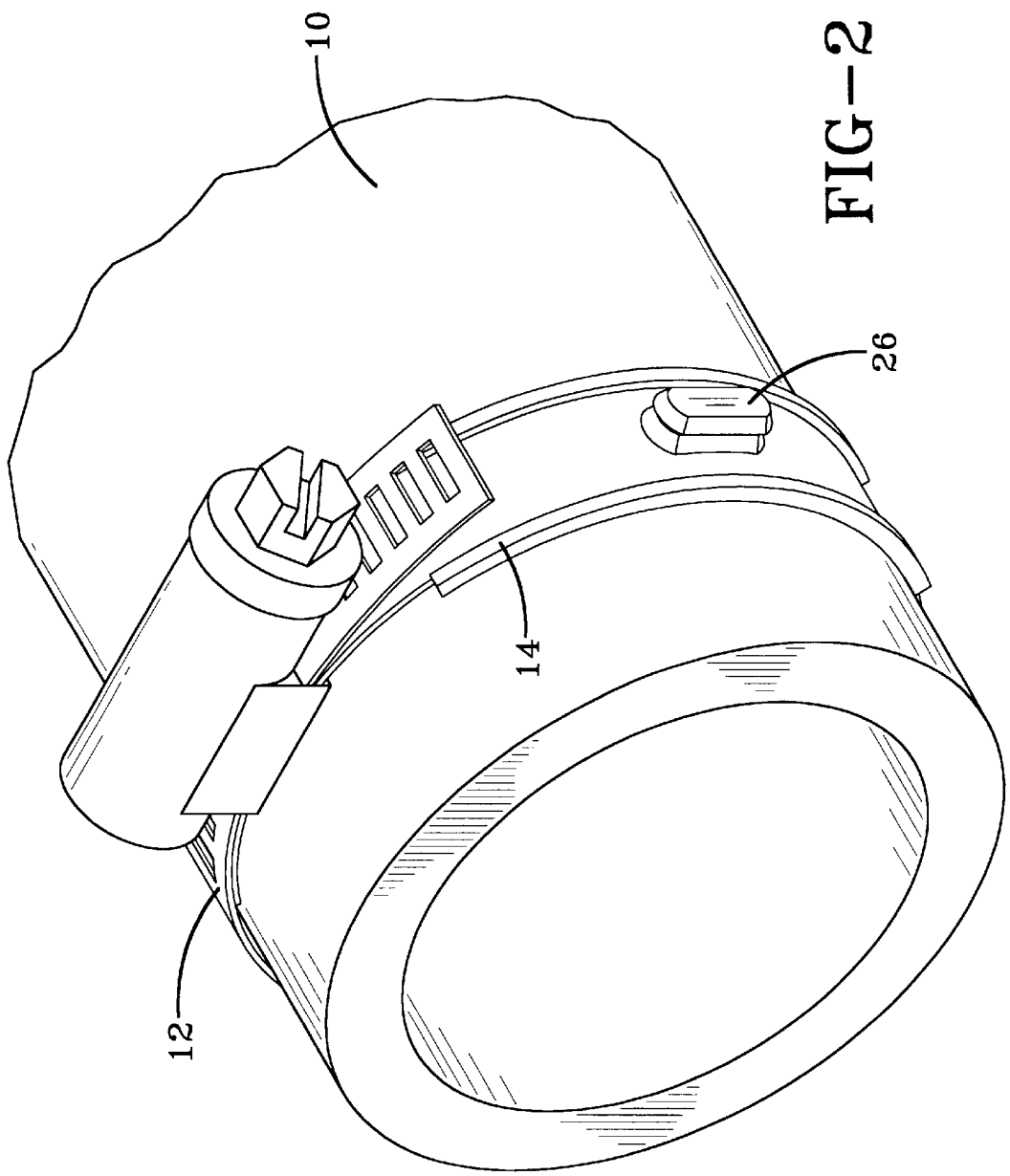

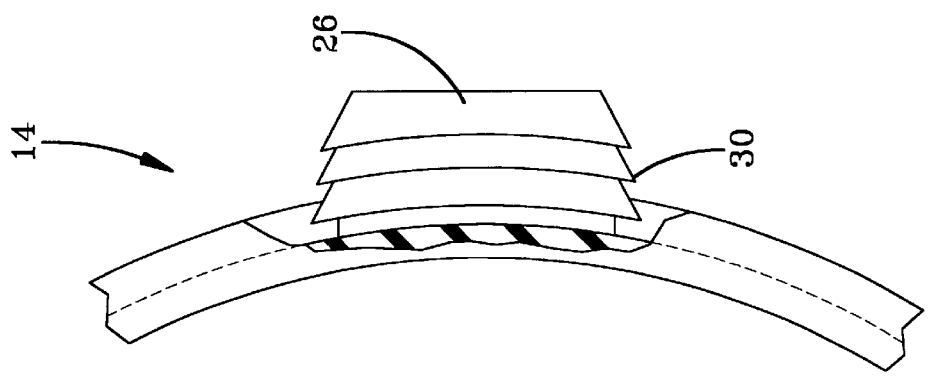
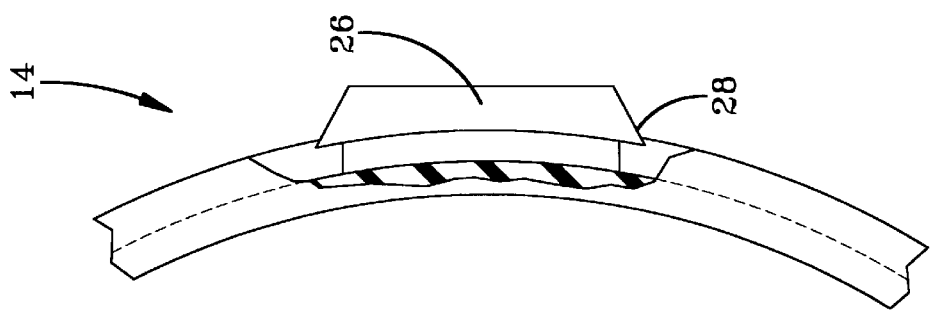
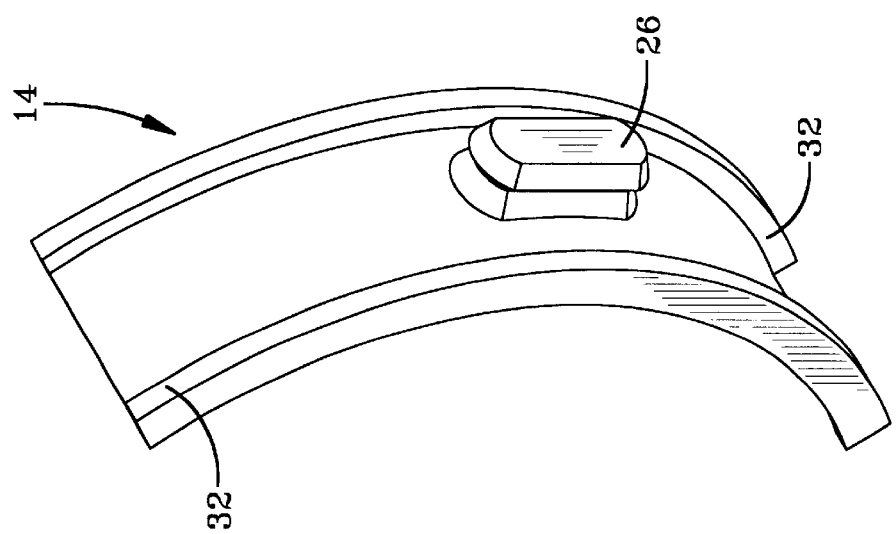

HOSE AND CLAMP ASSEMBLY

FIELD OF THE INVENTION

This invention relates to hose and clamp assemblies. More particularly, it deals with a hose clamp held securely to the hose by means of a clip located on the underside of the clamp and snap-fitted to the clamp.

BACKGROUND OF THE INVENTION

In the automotive industry, automotive manufacturers are increasingly insisting upon receiving parts partially assembled. For hoses, it has become required that they be supplied pre-assembled with clamps located at the precise location required for further assembly in the vehicle.

Different means have been employed to secure the clamps to the hoses. U.S. Pat. Nos. 5,002,094 and 5,185,913 disclose using an elastomeric piece overlapping the clamp to fix the clamp to the hose, but still enable the clamp to move to a certain degree about the circumference of the hose. U.S. Pat. Nos. 5,234,233, 5,388,321, and 5,456,784 disclose using some sort of sleeve that complete covers the length of the clamp, except for the tightening means to affix the location of the clamp relative to the hose. Circumferential movement is still permitted, but is more limited than previous methods. U.S. Pat. No. 5,622,391 discloses protrusions formed on the hose end over which the clamp is secured. Circumferential movement is further limited; however, the hose ends must be specially formed by injection molding or by the use of closed exterior molds, increasing the complexity of the hose formation and such a method of attaching the clamp is not possible if the hose was not originally intended to be clamped.

SUMMARY OF THE INVENTION

The present invention is directed to a hose and clamp assembly wherein the clamp is affixed to the hose in a single location, with limited circumferential movement wherein the manufacturing of the hose is not modified.

The hose and clamp assembly is comprised of a hose, an annular hose clamp, and a clip. The clamp has an aperture therein and, in the hose and clamp assembly, is placed around the hose in a predetermined location and orientation. The clip has a protrusion that extends through the clamp aperture for securing the clip to the clamp. The clip is secured to the underside of the clamp and the clip is secured to the hose.

Also disclosed is a method of producing a hose and clamp assembly. The method comprises providing a hose, a hose clamp with an aperture, and an arcuate clip with a protrusion. The clip is snap fitted to the clamp by putting the clip protrusion through the clamp aperture. The clip is secured to the hose, preferably by gluing the clip to the hose. The clip and the clamp may be snap fitted to each other either before or after the clip is glued to the hose.

BRIEF DESCRIPTION OF THE DRAWINGS

The invention will be described by way of example and with reference to the accompanying drawings in which:

FIG. 1 is a perspective view, blown apart, of the components of a hose and clamp combination of the present invention;

FIG. 2 is a perspective view illustrating the final assembly of the components of FIG. 1;

FIG. 3 is a perspective view of the clip;

FIGS. 3a and 3b are possible alternative constructions of the clip securing means;

DETAILED DESCRIPTION OF THE INVENTION

Figure 4:
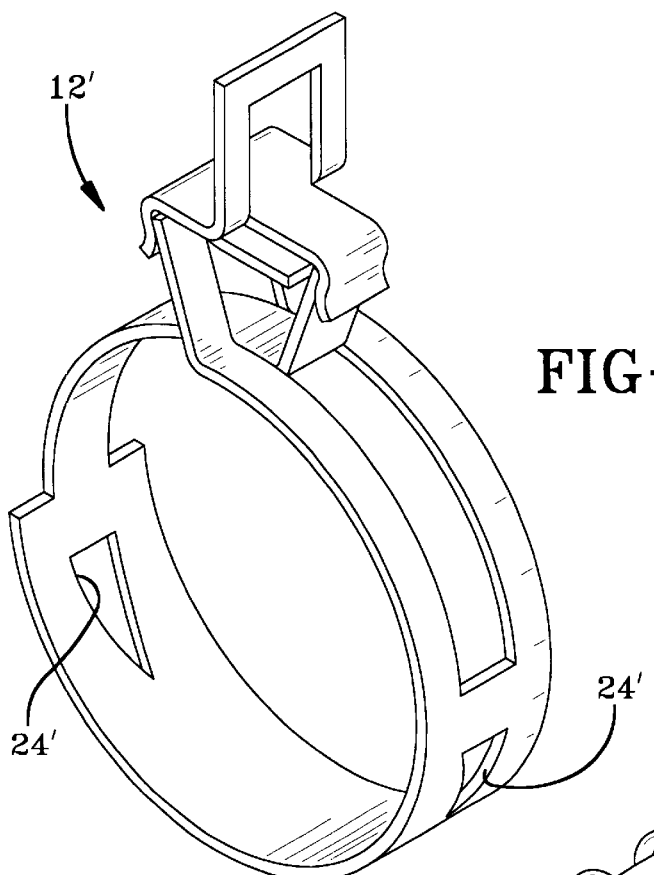
FIG. 4 is a perspective view of a typical constant tension clamp that can be used in the invention.

The hose and clamp assembly is comprised of a hose 10, a clamp 12 and a clip 14, see FIGS. 1 and 2. The hose 10 may be any conventional hose, such as a fuel filler hose, fuel line hose, air induction hose, transmission hose, air injection tube, drain hose, washing machine hose, or any fluid or air conveyance tube or hose that requires a clamp. The illustrated clamp 12 is a conventional radiator hose clamp having a worm screw 16, a band 18, and a clamp screw housing 20. The clamp 12 has a plurality of slots 22 formed in the band and at least one aperture 24.

The clip 14 has an arcuate shape, see also FIG. 3. In the illustrated clip 14, at the mid-point of the clip is a protrusion 26. The protrusion 26 has means to secure the clip 14 to the clamp 12 when the protrusion 26 is inserted into the clamp aperture 24. The securing means can be any of a variety of snap-fit type configurations from a single extending tip 28, as seen in FIG. 3a, to a multi-step barb 30, as seen in FIG. 3b.

The overall configuration of the protrusion 26 may correspond with the overall configuration of the clamp aperture 24. If the clamp aperture 24 is oval, than the overall configuration of the protrusion 26 is also oval. At least one dimension of the protrusion 26 is greater than the corresponding dimension of the aperture 24 so that when the protrusion 26 is inserted into the aperture 24, the clip 14 and the clamp 12 are secured to each other.

The clip 14 has ledges 32 running along both sides for centering of the clamp 12 onto the clip 14 when the protrusion 26 is inserted into the aperture 24; however, the ledges 32 may be absent so that the clip 14 may be used with varying width clamps 12.

The clip 14 is formed from any suitable material that can be molded to form the securing means. The clip 14 may be formed from any thermoplastics or rubber material so long as the securing means can be properly formed. The material may be flexible enough so that the radius defining the arcuate shape of the clip 14 may be increased or decreased for use with a variety of hose diameters. The material selection for the clip 14 will also be a determining factor for the selection of a glue to be used for securing the clip 14 to the hose 10. Examples of a suitable glue include, but are not limited to cyanoacrylate, epoxy, or the like.

Figure 5:
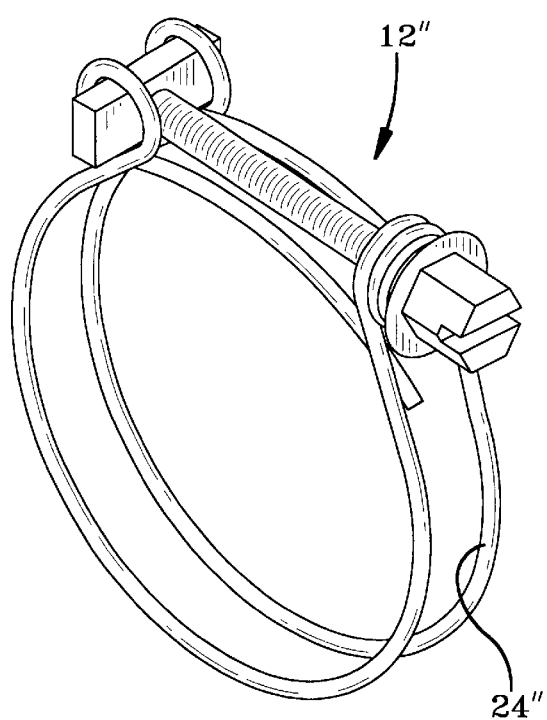
FIG. 5 is a perspective view of a typical two-wire clamp that can be used in the invention.

FIGS. 4 and 5 represent other typical hose clamps 12', 12" that can be used in the practice of this invention. The hose clamps 12', 12" have apertures 24', 24" that allow for the clip protrusion 26 to extend through the clamp 12', 12". Not illustrated, but also within the scope of the invention is a clip 14 having more than one protrusion 26. A multiple protrusion clip may be used with a clamp that has either multiple apertures or a single large aperture.

Assembly of the hose 10 and clamp 12 can occur several ways. The clip 14 may first be secured to the hose 10 and then the clamp 12, in an expanded position, is placed over the clip 14 with the aperture 24 and the protrusion 14 aligned and the clamp 12 is snap-fitted onto the clip 14. Conversely, the clamp 12 and clip 14 may be snap fitted together first and then the combination is fitted onto the hose 10 and secured into place.

By providing a clip 14 attached to the underside of the clamp 12, securing of the clamp 12 to the hose 10 can be achieved rapidly. By forming the clip 14 from a non-metallic material, securing the clip 14 and clamp 12 to the hose 10 can be accomplished with avoiding the challenge of bonding a smooth material such as the stainless steel clamp 12 to the hose 10. The present invention also provides a material surface that will bond with adhesives to provide a significant bond to the hose 10 while using a mechanical bond to hold the clamp 12 in place.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hose and clamp assembly comprising:
   a) a hose;
   b) an annular hose clamp having an aperture, the clamp being placed around the hose in a predetermined location and orientation; and
   c) a clip, the clip having a flat surface on one side and a protrusion on the opposing side, the protrusion extending through the clamp aperture for securing the clip to the clamp,
   wherein the flat surface of the clip is adhesively secured to the hose.

2. A hose clamp assembly in accordance with claim 1 wherein the clip protrusion has a series of barbs.

3. A method of producing a hose and clamp assembly comprising the steps of:
   a) providing a hose clamp with an aperture therein;
   b) providing a hose;
   c) providing an arcuate clip, the clip having a flat surface on one side and a protrusion on the opposing side;
   d) snap fitting the clip protrusion through the clamp aperture so the clip is located on the underside of the clamp;
   e) adhesively securing the flat surface of the clip to the hose.

4. A method in accordance with claim 3 wherein step d) is performed before step e).

5. A method in accordance with claim 3 wherein step e) is performed before step d).

* * * * *